US007650241B2

(12) United States Patent
Jogi et al.

(10) Patent No.: US 7,650,241 B2
(45) Date of Patent: Jan. 19, 2010

(54) USE OF THE DYNAMIC DOWNHOLE MEASUREMENTS AS LITHOLOGY INDICATORS

(75) Inventors: Pushkar Jogi, Houston, TX (US);
Joachim Oppelt, Niedersachsen (DE);
Gerald Heisig, Lower Saxony (DE);
Volker Krueger, Niedersachsen (DE);
John Macpherson, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 194 days.

(21) Appl. No.: 11/357,332

(22) Filed: Feb. 17, 2006

(65) Prior Publication Data

US 2006/0212224 A1 Sep. 21, 2006

Related U.S. Application Data

(60) Provisional application No. 60/654,192, filed on Feb. 19, 2005.

(51) Int. Cl.
*G01V 5/06* (2006.01)
*G01V 3/18* (2006.01)
(52) U.S. Cl. .............. 702/9; 702/6; 175/40; 175/50
(58) Field of Classification Search ............... 702/9,
702/6; 175/40–50
See application file for complete search history.

(56) References Cited

U.S. PATENT DOCUMENTS

| 4,445,032 | A  | * | 4/1984 | Halker et al. ............... 250/256 |
| 6,233,524 | B1 |   | 5/2001 | Harrell et al. |
| 6,408,953 | B1 |   | 6/2002 | Goldman et al. |
| 6,490,527 | B1 | * | 12/2002 | Utt ............................. 702/9 |
| 6,609,067 | B2 | * | 8/2003 | Tare et al. ..................... 702/9 |
| 6,727,696 | B2 | * | 4/2004 | Kruspe et al. ............... 324/303 |
| 7,044,238 | B2 | * | 5/2006 | Hutchinson ................. 175/50 |
| 7,172,037 | B2 | * | 2/2007 | Dashevskiy et al. .......... 175/25 |
| 7,193,414 | B2 | * | 3/2007 | Kruspe et al. ............... 324/303 |
| 2003/0221869 | A1 |   | 12/2003 | Ireland |
| 2004/0256152 | A1 |   | 12/2004 | Dashevskiy et al. |
| 2005/0060096 | A1 | * | 3/2005 | Hutchinson .................. 702/6 |

OTHER PUBLICATIONS

J. R. Jorden et al.; "Application of Drilling Performance Data to Overpressure Detection," Journal of Petroleum Technology, Nov. 1966, pp. 1387-1394.

P.N. Jogi et al.; "The Application of a New Drilling Model for Evaluating Formation and Downhole Drilling Conditions," SPE 24452, Seventh SPE Petroleum Computer Conference, Houston, Texas Jul. 19-22, 1992, pp. 275-286.

(Continued)

*Primary Examiner*—Edward Raymond
*Assistant Examiner*—Elias Desta
(74) *Attorney, Agent, or Firm*—Madan & Sriram, P.C.

(57) ABSTRACT

A drilling system provides indications of the lithology of the formation being drilled by dynamically measuring at least one parameter of interest that is affected by the lithology of the formation being drilled. Suitably positioned sensors make dynamic measurements of parameters such as downhole weight on bit, bit torque, bit revolutions, rate of penetration and bit axial acceleration. One or more processors use the sensor measurements in conjunction with predetermined lithological models to determine whether the measurements indicate a change in formation lithology. Suitable models can be on derived expressions such as rock drillability, drilling response, dynamic drilling response, normalized or dimensionless torque; and formation shear strength. The lithological indications provided by the processor can be used to adjust drilling parameters, steer the BHA, monitor BHA health, and provide depth locations for bed boundaries and formation interfaces.

34 Claims, 16 Drawing Sheets

OTHER PUBLICATIONS

I.G. Falconer et al.; "Separating Bit and Lithology Effects from Drilling Mechanics Data," IADC/SPE 17191 1988 IADC/SPE Drilling Conference, Dallas, Texas, Feb. 28-Mar. 2, 1988, pp. 123-136.

Applications & Technology Research Section Explporation Logging Inc., "Drilling Model Source Document," Aug. 1984, pp. 1-158, Appendix A, Appendix B, Appendix C.

\* cited by examiner

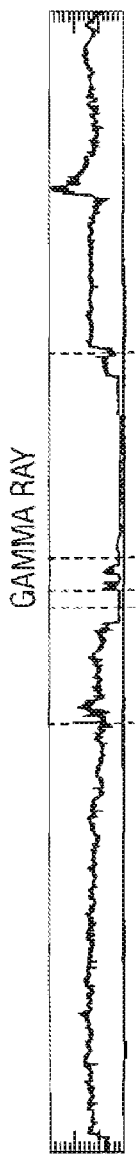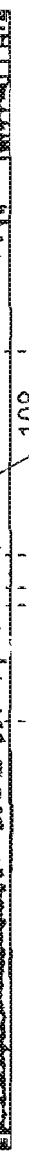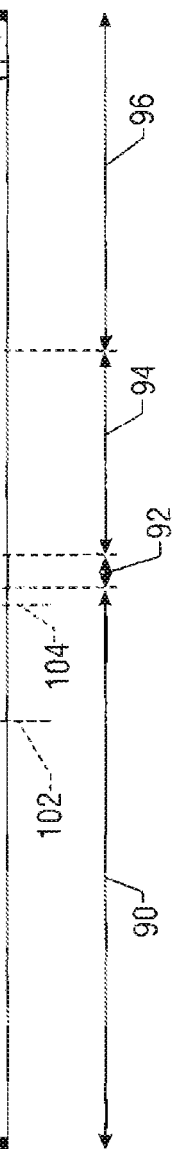

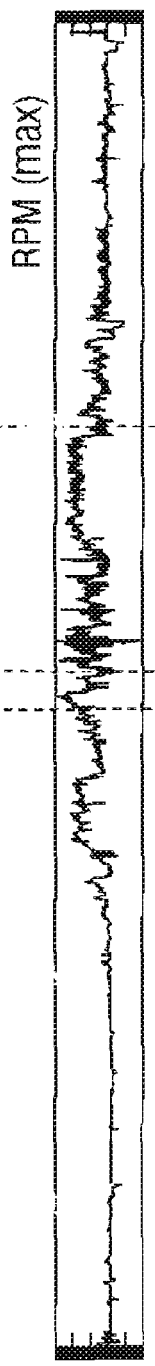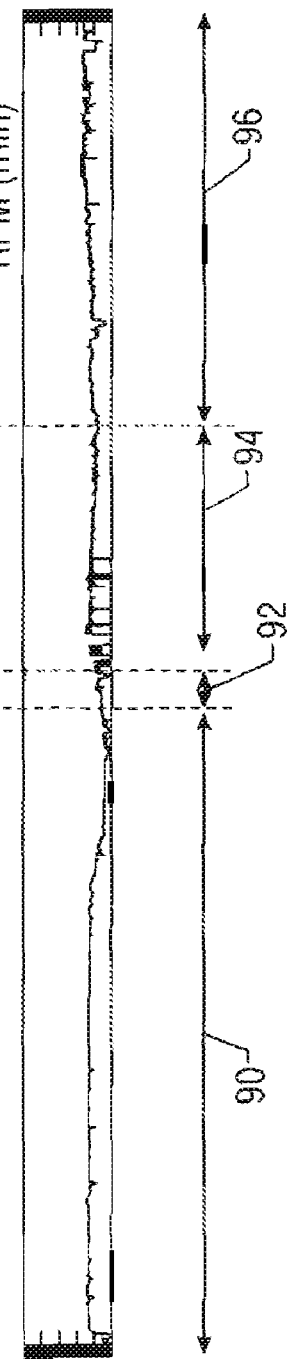

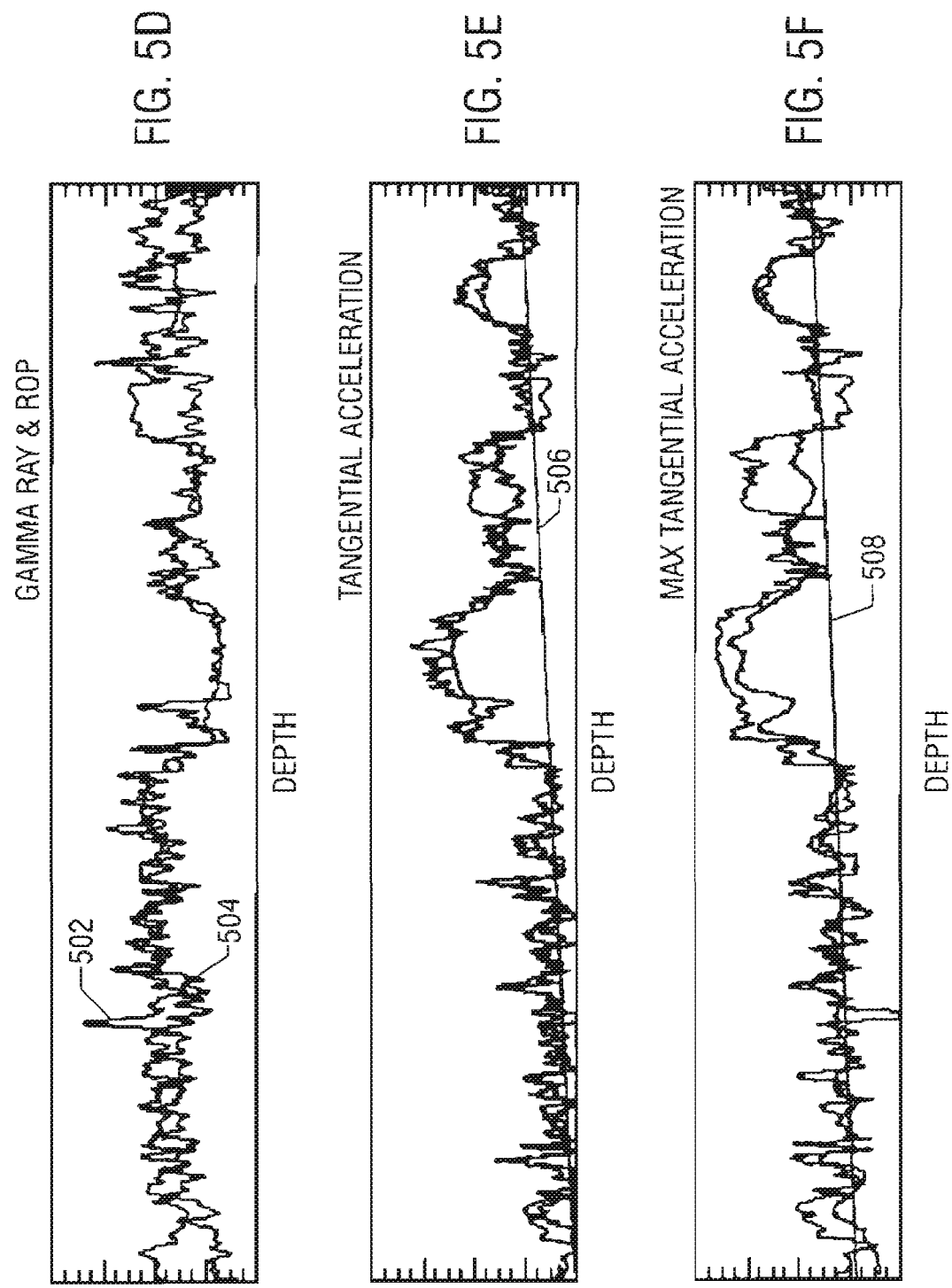

FIG. 5G GAMMA RAY
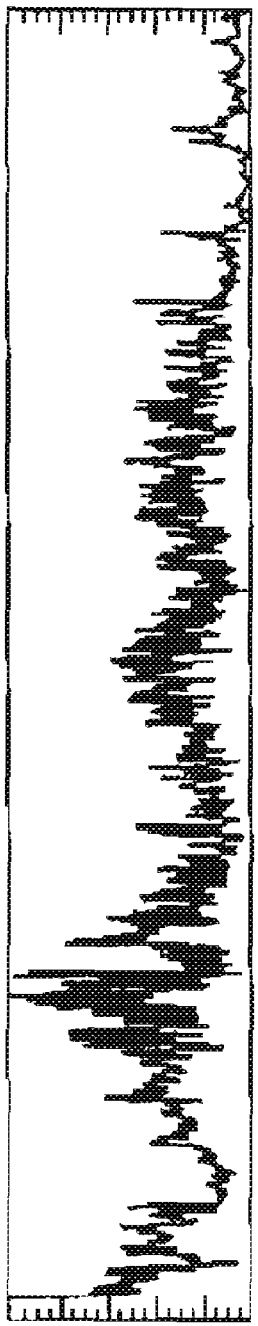
FIG. 5H RATE OF PENETRATION
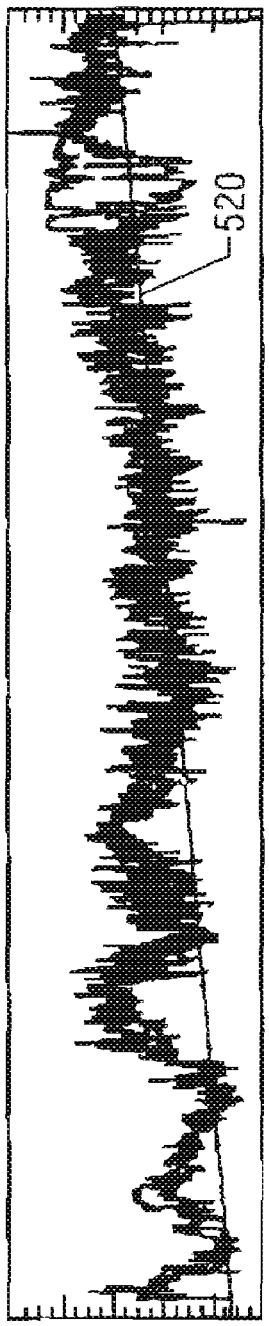
FIG. 5I MAX LATERAL ACCELERATION

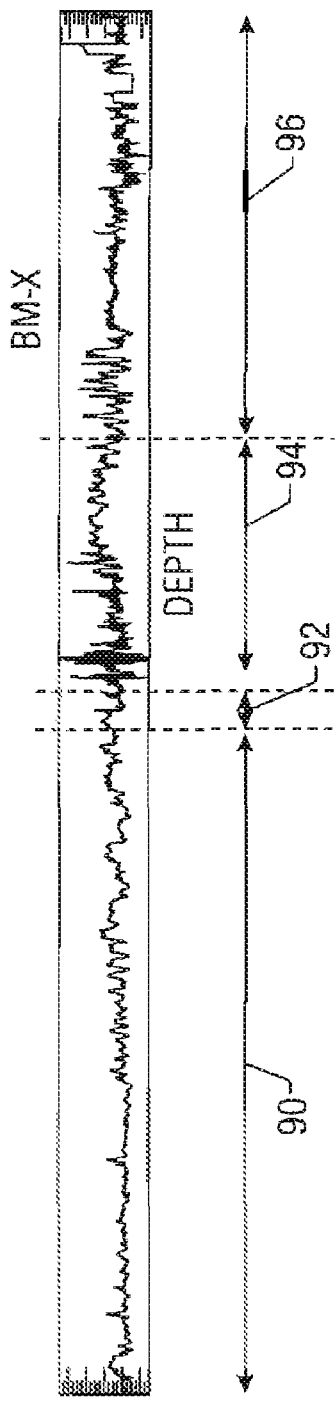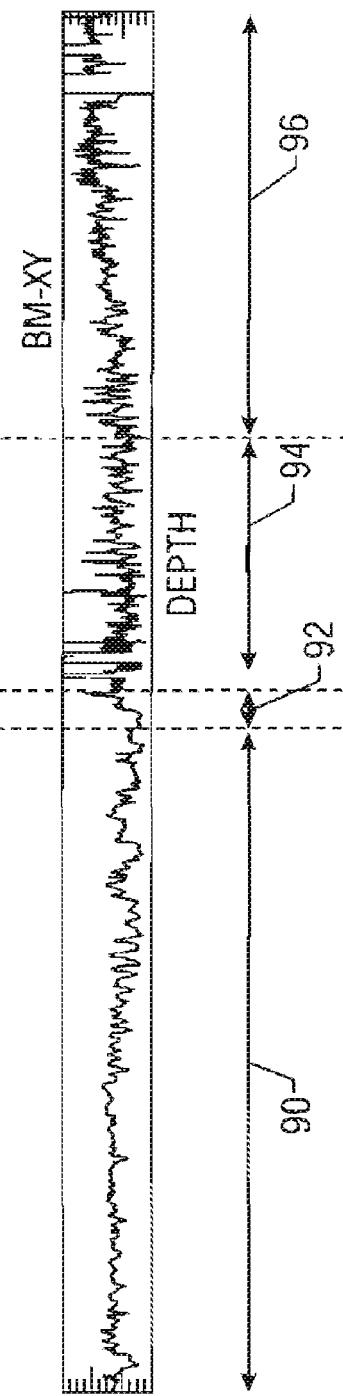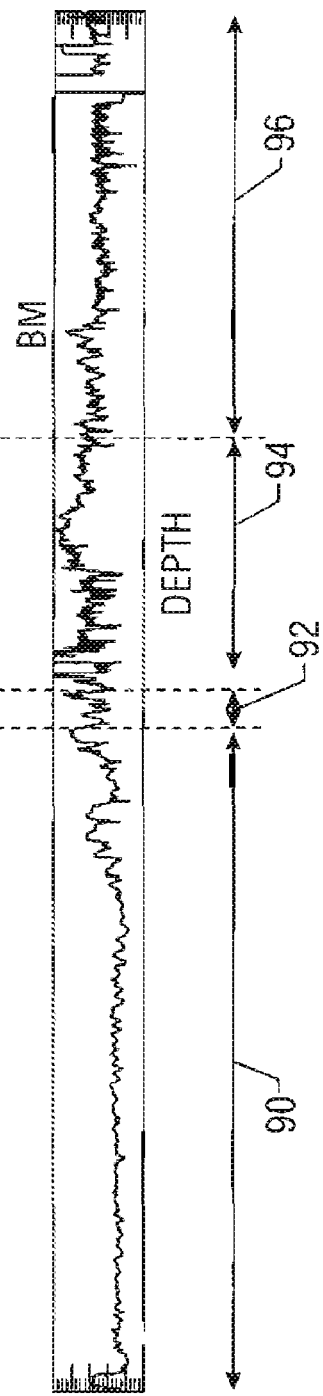

USE OF THE DYNAMIC DOWNHOLE MEASUREMENTS AS LITHOLOGY INDICATORS

CROSS REFERENCE TO RELATED APPLICATION

This application takes priority from U.S. Provisional Patent Application Ser. No. 60/654,192, filed on Feb. 19, 2005.

BACKGROUND OF THE INVENTION

1. Field of the Invention

This invention relates to systems, devices and methods for determining the lithology of a formation while drilling a wellbore. More particularly, this invention relates to systems, devices and methods that utilize dynamic measurements of selected drilling parameters to determine the lithology of a formation being drilled.

2. The Related Art

To obtain hydrocarbons such as oil and gas, boreholes are drilled by rotating a drill bit attached at a drill string end. A large proportion of the current drilling activity involves directional drilling, i.e., drilling deviated and horizontal boreholes, to increase the hydrocarbon production and/or to withdraw additional hydrocarbons from the earth's formations. Modern directional drilling systems generally employ a drill string having a bottomhole assembly (BHA) and a drill bit at end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, azimuth and inclination measuring devices and a resistivity measuring device to determine the presence of hydrocarbons and water.

Additional downhole instruments, known as logging-while-drilling ("LWD") tools, are frequently attached to the drill string to determine the formation geology and formation fluid conditions during the drilling operations. Logging-while-drilling (LWD) systems, or more generally speaking, Measurement-While-Drilling (MWD) systems, are known for identifying and evaluating rock formations and monitoring the trajectory of the borehole in real time. An MWD set of tools is generally located in the lower portion of the drill string near the bit. The tools are either housed in a section of drill collar or formed so as to be compatible with the drill collar. It is desirable to provide information of the formation as close to the drill bit as is feasible. Several methods for evaluating the formation using the drill bit have been employed. These methods eliminate the time lag between the time the bit penetrates the formation and the time the MWD tool senses that area of the formation. However, they work only under certain formation characteristics. Another approach to determine formation or lithology changes has been to use the mechanic measurements available at the surface, such as measured rate of penetration (ROP) and bit revolutions per minute (RPM) and average or mean downhole weight on bit (WOB) and average or mean downhole torque on the bit (TOR) that are derived from real time in situ measurements made by an MWD tool.

While conventional devices and methods for determining lithology have provided adequate results only in very few applications, there is a persistent need for systems, devices and methods that provide more accurate indications of the lithology being drilled.

SUMMARY OF THE INVENTION

In aspects, the present invention provides indications of the lithology of the formation being drilled. An exemplary system made in accordance with the present invention determines properties of a formation being drilled by dynamically measuring at least one parameter of interest that is affected by the lithology of the formation. The system includes suitable sensors positioned in a bottomhole assembly (BHA) to make dynamic measurements and can also include sensors positioned proximate to the drill bit, along the drill string, and at the surface. Using one or more processors, the system determines at least one lithological characteristic of the formation being drilled using the sensor measurements in conjunction with predetermined lithological models.

Exemplary parameters of interest measured by the downhole sensors include downhole weight on bit (WOB), bit torque (TOR), bit revolutions (RPM), bit axial acceleration, tangential acceleration and lateral acceleration. These measurements can be instantaneous, maximum, and/or minimum values. Exemplary parameters of interest measured by the surface sensors include rate of penetration (ROP) and surface weight on bit. Dynamic measurements of one or more of these parameters, along with other measured parameters, are processed by the processor using the lithological models that are stored in a memory module. Suitable models can be derived expressions such as $$\frac{RD}{WN}$$

(rock drillability), $$\frac{RD^3}{NW^2}$$

(drilling response for roller cone bits), $$\frac{TR}{W^2N},$$

(drilling response), $$\frac{TA_x}{[WN]^2}$$

(dynamic drilling response), $$\frac{T}{WD},$$

(normalized or dimensionless torque); and $$\frac{TN}{RD^2}$$

(formation shear strength).

Depending on the type of telemetry system used (e.g., a high bandwidth system or low bandwidth system), the processor can be a surface processor that processes surface measurements and measurements transmitted from the BHA, a downhole processor that processes downhole measurements and measurements transmitted from the surface, or a surface and downhole processor that cooperatively process downhole and surface measurements.

The lithological indications provided by the processor can be used to adjust drilling parameters (e.g., drilling mud weight), steer to a productive formation, steer away from an fault or other undesirable region, monitor BHA health, and provide precise depth locations for bed boundaries and formation interfaces.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, reference should be made to the following detailed description of the preferred embodiment, taken in conjunction with the accompanying drawing:

FIGS. 3A-E illustrate plots of gamma ray, resistivity, ROP, Torque and WOB versus depth D, respectively;

FIGS. 5A-C illustrate plots of S1, RPM (Max), and RPM (Min) versus depth D, respectively;

FIGS. 5D-F illustrate plots of gamma ray, ROP, maximum lateral acceleration versus depth D, respectively;

FIGS. 6A-C illustrate plots of BM-X, BM-XY, and BM versus depth D. respectively;

DETAILED DESCRIPTION OF THE INVENTION

Figure 1:
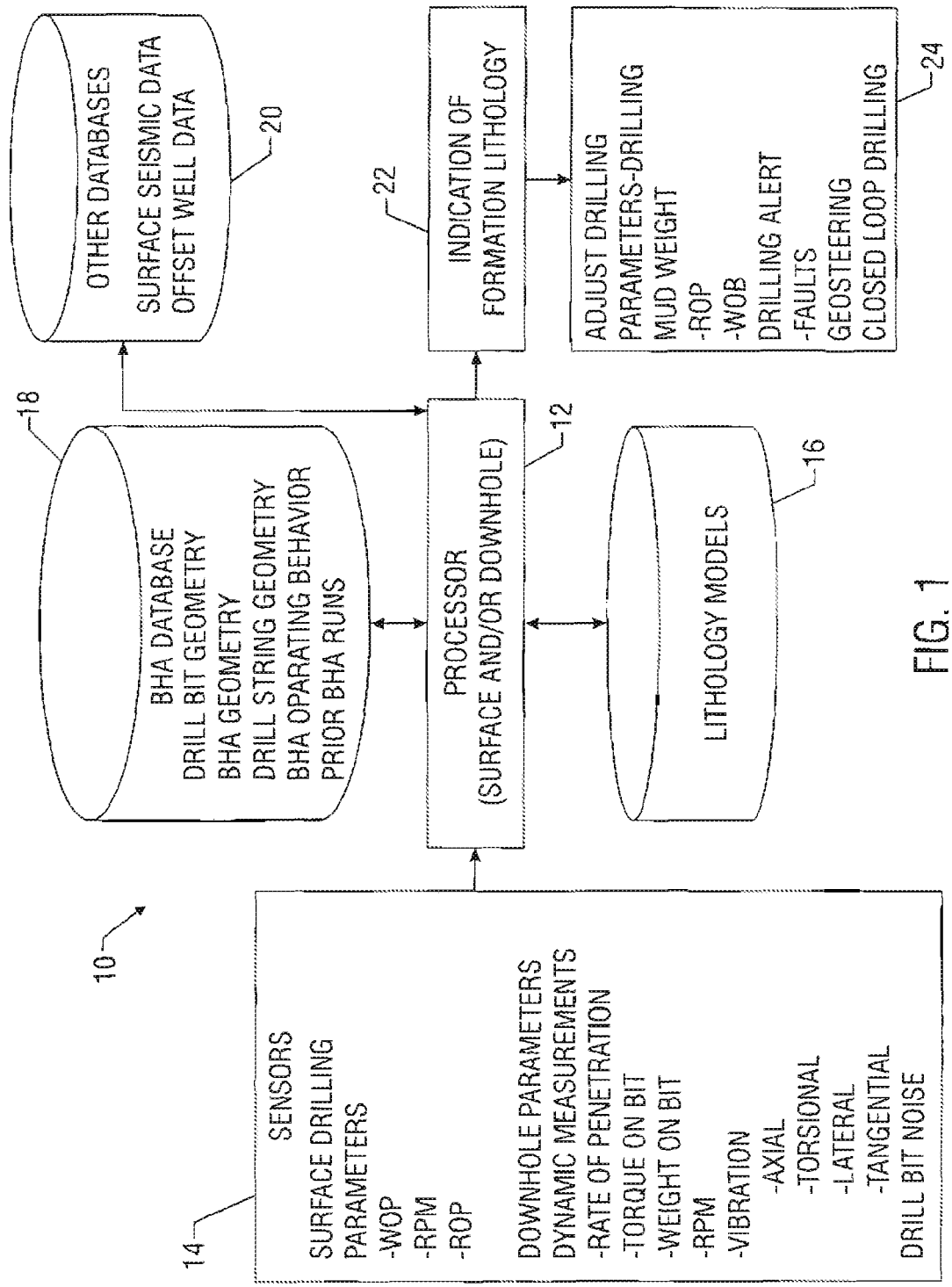
FIG. 1 is a block diagram of one exemplary system in accordance with the present invention for determining the lithology of a formation while drilling.

The teachings of the present invention can be applied in a number of arrangements to generally improve the drilling process by providing indications of the lithology of the formation being drilled. As is known, formation lithology generally refers to an earth or rock characteristic such as the nature of the mineral content, grain size, texture and color. Such improvements may include reduced drilling time and associated costs, safer drilling operations, more accurate drilling, improvement in ROP, extended drill string life, improved bit and cutter life, reduction in wear and tear on BHA, and an improvement in bore hole quality. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

Referring now to FIG. 1, there is shown in block diagram form one exemplary system 10 made in accordance with the present invention for determining the lithology of a formation being drilling. The system 10 includes a processor or processors 12 that communicate with downhole and surface sensors 14 to determine the lithology of the formation being drilled. The sensors 14 include one or more sensors that can dynamically measure drilling parameters such as instantaneous torque, weight on bit, and RPM of the drill bit. By "dynamic" measurements, it is meant measurement of a parameter at a specific point in time rather than measurement over a period of time. For example, over a five-second period, the measured RPM of a drill string may be one hundred RPM. In contrast, "dynamic" measurements of RPM over that same five-second interval could include five measurements taken at one second intervals (e.g., ninety RPM, one hundred ten RPM, one hundred five RPM, ninety five RPM, and one hundred RPM). Thus, dynamic measurements can provide greater details as to the behavior of a drill bit, drill string, or BHA during drilling.

The processor 12 uses lithology indication models 16 along with pre-programmed databases 18 and 20 to process the sensor measurements to ascertain the lithological nature of the formation. As discussed in greater detail below, the models 16 can be theoretically or empirically derived expressions that can be used to evaluate the measured data and determine whether the measured data indicates a change in formation lithology. The BHA database 18 can include information such as drill bit diameter and other such "fixed" equipment data. The BHA database 18 can also include data for determining whether the processed measured data indicates a change in lithology or whether the processed measured data suggests some other situation; e.g., a failure in a BHA component (e.g., locked/failed bearing), tooth/cutter wear, drilling on a stabilizer etc. Such data can be accumulated, for example, from prior BHA operating runs or predictive modeling. Still other data 20 that can be used by the processor 12 includes surface seismic data and offset well data.

The processor(s) 12 outputs an indication 22 of the lithology, which can serve a number of purposes. As shown in block 24, the indication 18 can be used to optimize or adjust drilling parameters, to issue drilling alerts relating to faults, high-pressure zones, to geosteer the BHA, to correct or supplement surface seismic data, etc.

Figure 2:
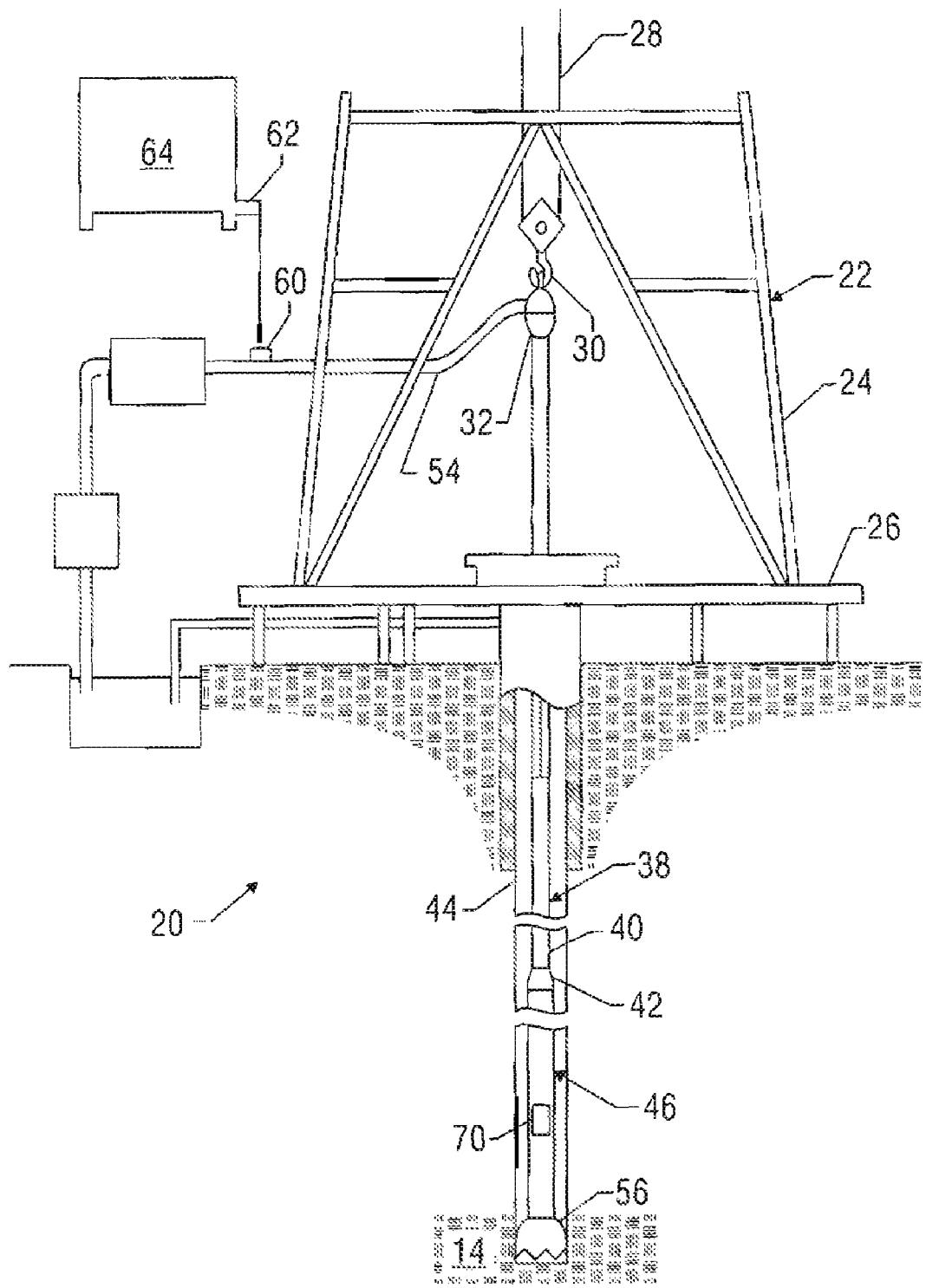
FIG. 2 is an elevation view of an exemplary drilling system utilizing the FIG. 1 methodology in accordance with the present invention

Referring now to FIG. 2, there is shown an exemplary drilling system 20 utilizing aspects of the FIG. 1 system. As is shown, a conventional rig 22 includes a derrick 24, derrick floor 26, draw works 28, hook 30, swivel 32, kelly joint 34, and rotary table 36. A drillstring 38 which includes drill pipe section 40 and drill collar section 42 extends downward from rig 22 into a wellbore 44. Drill collar section 42 preferably includes a number of tubular drill collar members which connect together, including a measurement-while-drilling (MWD) subassembly and cooperating telemetry data transmission subassembly, which are collectively referred to hereinafter as "MWD system 46". The drill string 38 includes a drill bit 56 adapted to disintegrate a geological formation and known components such as thrusters, mud motors, steering units, stabilizers and other such components for forming a wellbore through the subterranean formation 14. Other related components and equipment of the system 20 are well known in the art and is not described in detail herein.

Also, it should be understood that applications other than rotary drives (e.g., coiled tubing applications) may utilize other equipment such as injectors, coiled tubing, a drilling motor, thrusters, etc. Drilling systems utilizing coiled tubing as the drill string are within the scope of the present invention.

The MWD system 46 includes sensors, circuitry and processing software and algorithms for providing information about desired dynamic drilling parameters relating to the BHA, drill string, the drill bit and downhole equipment such as a drilling motor, steering unit, thrusters, etc. (collectively, a bottomhole assembly or BHA). Exemplary sensors include, but are not limited to, drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED. Suitable systems are also discussed in "Downhole Diagnosis of Drilling Dynamics Data Provides New Level Drilling Process Control to Driller", SPE 49206, by G. Heisig and J. D. Macpherson, 1998, which is hereby incorporated by reference for all purposes.

The MWD system 46 can include one or more downhole processors 70. The processor(s) 70 can be microprocessor that uses a computer program implemented on a suitable machine readable medium that enables the processor to perform the control and processing. The machine readable medium may include ROMs, EPROMs, EAROMs, Flash Memories and Optical disks. Other equipment such as power and data buses, power supplies, and the like will be apparent to one skilled in the art.

In one embodiment, the MWD system 46 utilizes mud pulse telemetry to communicate data from a downhole location to the surface while drilling operations take place. To receive data at the surface, a transducer 60 is provided in communication with mud supply line 54. This transducer generates electrical signals in response to drilling mud pressure variations. These electrical signals are transmitted by a surface conductor 62 to a surface electronic processor 64, which is preferably a data processing system with a central processing unit for executing program instructions, and for responding to user commands. For systems utilizing mud pulse telemetry or other systems having limited data transfer capability (e.g., bandwidth), the processor 12 of the FIG. 1 system can utilize the downhole processor 70 in conjunction with the surface processor 64. For example, the downhole processor 70 can process the downhole measured data and transmit reduced data and/or signals indicative of the lithology being drilled to the surface. The surface processor 64 can process the surface measured data, along with the data transmitted from the downhole processor 70, to evaluate formation lithology.

In another embodiment, the MWD system 46 utilizes a telemetry system providing relatively high bandwidth; e.g., conductive wires or cables provide in or along the drill string, RF or EM-based systems, or other systems. In such systems, "raw" or unprocessed data, in addition to or instead of processed data, can be transmitted to the surface processor 64 for processing. In such an arrangement, a downhole processor 70 may not be needed. In another arrangement, the surface measurements are transmitted downhole and the downhole processor 70 processes the surface and downhole data. In this arrangement, only the downhole processor 70 is used to obtain lithological indications. It should therefore be appreciated that a number of arrangements can be used for the processor 12 of FIG. 1; e.g., a surface processor that processes downhole and surface measurements, a downhole processor that processes downhole and surface measurements, and a surface and downhole processor that cooperatively process downhole and surface measurements.

Referring still to FIG. 1, the processors 12 use the preprogrammed lithology indication models 16 that use measurements of one or more parameters that can be affected by the lithology of the formation being drilled. These parameters include, but are not limited to, downhole torque on bit (DTOB), downhole weight on bit (DWOB), instantaneous downhole RPM of the drill string, and motion of the drill bit and drill string (torsional acceleration, bit axial acceleration, ROP, tangential acceleration, lateral acceleration). The models 16, either separately or cooperatively, process the measured data to ascertain changes in the lithological formation of the drilled formation. Measurements of such parameters react differently to different lithologies while drilling. Accordingly, the models 16 can utilize a variety of schemes or methodologies to quantify changes in measured values of these parameters (e.g., magnitude, slope, maxima, minima, etc.). The models 16 can be in the form of software, algorithms, or instructions loaded into a memory module (not shown) of the processor 12.

Illustrative methodologies suitable for developing the models 16 are discussed below. Based on the analysis of interaction between a PDC bit (or Rock Bit) and rock formation (under in situ drilling conditions), it has been shown that:

$$\frac{T}{WD} = \frac{\mu}{4}\cos\beta + \frac{\tau}{c_1}\left[1 - c_1\mu\frac{\sigma}{\tau}\tan\theta\right]\frac{RD}{WN} \qquad (1)$$

Where T represents torque on bit, W the downhole weight on bit, R the ROP, N the RPM and D the bit diameter. Also, in the above expression, $\sigma$ and $\tau$ represent the drilling and shear strengths of the formation, and $\theta$ and $\beta$ the back rake and side rake bit cutter angels. It should be noted that $\sigma$ and $\tau$ as defined above, are functions of pore pressure, rock compressive strength, friction coefficient and bit geometry. In equation 1, the parameters $$\frac{T}{WD} \text{ and } \frac{RD}{WN}$$

are called normalized (or dimensionless) torque and rock drillability, respectively. Discussion of these and other relationships are provided in Jogi, P. N. & Zoeller W. A. "The application of a new drilling model for evaluating formation and Downhole Drilling Conditions", $7^{th}$ SPE Petroleum Computer Conference, Houston, Tex. Jul. 19-22, 1992, which is hereby incorporated by reference for all purposes. The inverse of drillability is known as rock (or drilling) strength. It has been shown that rock strength is a function of $\sigma$ and the normalized torque is a function of $$\frac{\sigma}{\tau}.$$

Therefore, both these parameters are functions of lithological change. It has also been shown that changes in the bit torque to weight ratio, and drillability, can be used to classify porous, shaly or hard formations. Additionally, such changes are also affected by formation pressures.

Drilling response, defined by the expression $$\frac{TR}{W^2N},$$

has been shown to be related to rock drilling strength and shear strength by the following expression:

$$\frac{TR}{W^2N} = \frac{\tau}{\sigma^2}c\left[\frac{\cos\beta}{\tan\theta}\right]f(\eta) \quad (2)$$

Where $\eta$ is called the wear factor and equals 1 for a new bit. The above expression can also be written as $$\log\left[\frac{TR}{W^2N}\right] = \log\left[\frac{\tau}{\sigma^2}c\right] + \log\left[\frac{\cos\beta}{\tan\theta}\right] + \log[f(\eta)] \quad (3)$$

In this expression the first term on the right hand side represents the formation response and the other two terms are functions of formation compaction and bit wear. Thus, when plotted on a log scale, the drilling response curve represents a formation log, and its slope is a function of formation compaction and bit wear.

Based on derived models for roller cone bits, it has been shown that $$R = \left[\frac{d_c}{\pi\eta b}\right]\left[\frac{NW^2}{D^3}\right][\tan^2(\vartheta-\phi)]K_2^2K_1 \quad (4)$$

Where $d_c$ is the cone diameter (maximum), b is the tooth width, $\eta$ represent the number of teeth per cone, $\theta$ and $\Phi$ represent the bit tooth angle and the formation internal friction angle respectively, $K_1$ is a formation related parameter and $K_2$ is function of the internal friction angle and differential pressure and rock shearing strength. Equation 4 can therefore be expressed as $$\left[\frac{RD^3}{NW^2}\right] = d_r^r \quad (5)$$

For PDC bits, the drilling response is given by $$d_r^p = \frac{RD}{WN} \quad (6)$$

Where $$d_r^p = \left[\frac{10(1-\sin\phi)\cot(\vartheta+\beta)}{p_m(1+\sin\phi)+2(c\cos\phi-p_p\sin\phi)}\right] \quad (7)$$

In equation 7, $\beta$ is the cutter back rake angle, $\Theta$ is the formation friction angle, $p_m$ and $p_p$ represent the mud and pore pressures respectively, and c is the formation cohesive strength. This expression has the same form as drillability, discussed above. Parameters $d_r^p$ and $d_r^p$ in equations 5 and 7 are functions of lithology, differential pressure and cutter properties, and therefore represents drilling response.

The variation of torque about a mean value caused by stick slip is strongly related to the friction properties of the lithology being drilled. The mean torque on the other hand is related to rock strength. Torque oscillations, therefore, can vary with changing lithologies, particularly in case of PDC bits. Changing lithologies can also cause changes in bit noise (also called SNAP) in terms of frequency and amplitude. This can further help in the process of lithological identification when used in conjunction with ROP. For example, fractured formations may show a sudden loss of SNAP with a sudden increase in ROP.

Instantaneous downhole RPM (when compared to the mean), like torque, can also show significant changes due to differences in stick-slip patterns in changing lithologies. However, as the bit drills into the formation, the teeth wear (and cutters break) and therefore lose their aggressiveness. This manifests itself in the reduction in both static and dynamic torque. Correlation of the reduction in dynamic torque and static torque with trends in ROP can help in identifying this process. Cone locking can cause a tricone bit to act as a PDC bit, thereby resulting in loss of SNAP energy. Similarly, bit balling and bearing wear, which can cause tooth breakage, can also cause loss of SNAP energy. Thus, bit related problems are considered while analyzing lithologies.

Therefore, the three parameters DWOB, DTOB, RPM (instantaneous) and the resulting bit (axial) acceleration (of SNAP) and ROP, which are all affected by the lithology being drilled, or a composite log composed of these parameters, can be used to detect lithological changes while drilling.

Using the assumption that the formation response is a function of weight on bit (W), torque on bit (T) RPM (N), axial acceleration (Ax), ROP and bit diameter (D), dimensional analysis indicates that formation changes are related to changes in the following grouped drilling parameters, some of which are the well known model derived parameters discussed above:

(i)

$$\frac{RD}{WN},$$

known as rock drillability, is the inverse of rock strength;

(ii)

$$\frac{RD^3}{NW^2}$$

represents the drilling response based on the SLDT model (roller cone bits);

(iii)

$$\frac{TR}{W^2N},$$

is known as the drilling response;

(iv)

$$\frac{TA_x}{[WN]^2}$$

which may be called dynamic drilling response;

(v)

$$\frac{T}{WD},$$

which is known as the normalized (or dimensionless) torque;

(vi)

$$\frac{TN}{RD^2}$$

which is related to formation shear strength.

Except for the dynamic drilling response expression which was derived from dimensional analysis, the other model and dimensional analysis derived parameters involve use of ROP, which is a surface measured parameter. The dynamic drilling response expression uses only dynamically measured parameters.

Test data having dynamic measurements were used to calculate the various parameters discussed above. The results from this analysis were compared with two lithology indicator logs: gamma ray and electromagnetic propagation resistivity (phase and amplitude). The gamma ray curve, which differentiates potentially productive formations (sandstones and limestone's) from other lithologies, is essentially a shale log, as it reflects the shale content in a formation. The electromagnetic propagation resistivity tool provides the phase difference and attenuation of a constant frequency signal propagating through the formation. These two measurements represent the phase and amplitude changes in the signal between two receiving antennas and are inversely related to the changes in formation resistivity.

The drilled formation consists of four general lithologies: (i) claystone and shale from a first depth interval 90, (ii) limestone, chert and shale in a second depth interval 92, (iii) chalk in a third depth interval 94, and (iv) claystone/siltstone in a fourth depth interval 96. It should be understood that the graphs shown in the Figures discussed below have been annotated for convenience and represent approximations rather than actual data, which, of course, varies from formation to formation.

FIGS. 3A-E show plots of gamma ray (FIG. 3A), resistivity (FIG. 3B), downhole weight on bit (DWOB) (FIG. 3C), downhole torque on bit (DTOB) (RMS and average) (FIG. 3D) and rate of penetration (ROP) (FIG. 3E) versus depth. A correlation between formation changes and corresponding changes in the three measured parameters, particularly ROP and DTOB, can be observed. The DTOB and ROB stay constant during a claystone shale interval 90. Then ROP, DTOB and DWOB show a change at a depth 102, followed by another change at a depth 104 and so on. These changes can be observed in both gamma and resistivity plots. Curves for DTOB and DWOB plots that represent the average values are labeled with numeral 106. Curves for DTOB and DWOB plots that represent the RMS values are labeled with numerals 108.

Figure 4A:
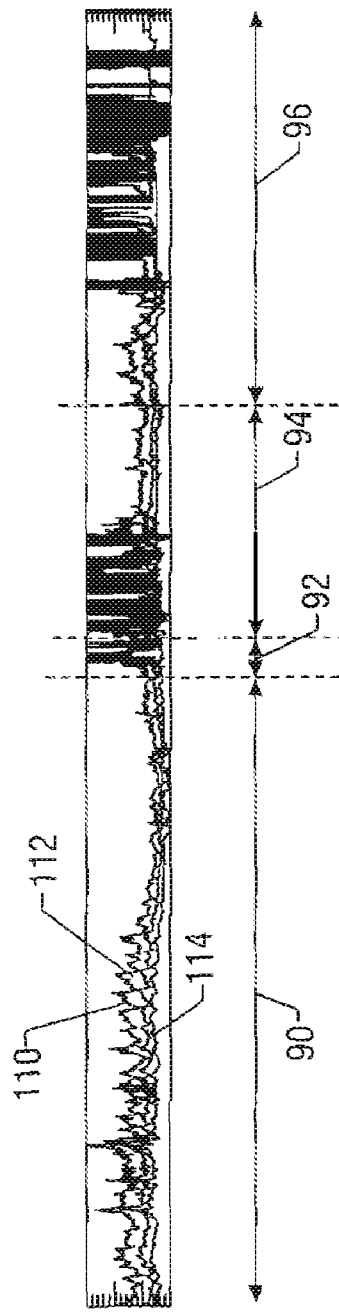
FIGS. 4A-C illustrate plots of X-Acceleration, Z-acceleration, and HFRMS versus depth D, respectively.
Figure 4B:
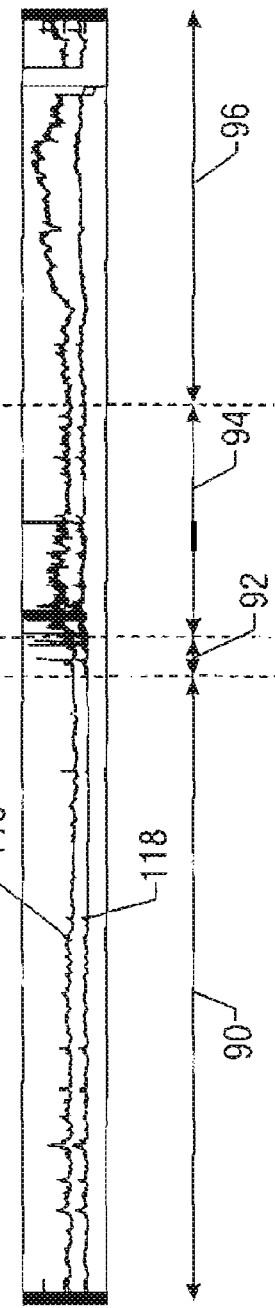
Figure 4C:
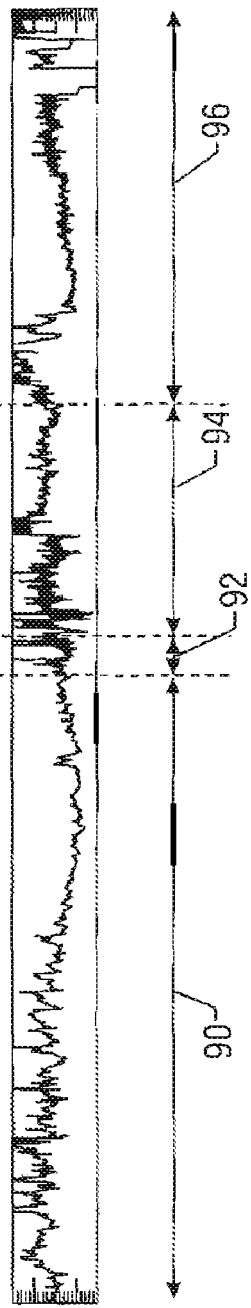

FIGS. 4A-4C show plots of x-axis acceleration (FIG. 4A), z-axis acceleration (FIG. 4B), and high frequency axial strain (HFRMSR) also called SNAP (FIG. 4C). The depth values in FIGS. 4A-C generally correspond with the depth shown in FIG. 3A. The x-acceleration (lateral) plot includes plots of a maximum one second RMS lateral acceleration curve 110, a maximum lateral acceleration curve 112, and a maximum RMS lateral acceleration curve 114. The z-acceleration plot shows the maximum axial acceleration curve 116, and maximum one second RMS axial acceleration curve 118. These plots show some activity or changes in the claystone region and chalk region, but in general do not show any clear-cut changes at or around the location of lithology changes. Nevertheless, modifications/adjustments to the placement of the sensors, operating parameters, BHA design, processing methodology/formulas, may result in the FIG. 4A-C parameters providing indications of lithological change.

FIGS. 5A-C shows plots of stick-slip (S1) (FIG. 5A), maximum RPM (FIG. 5B), and minimum RPM (FIG. 5C). The depth values in FIGS. 5A-C generally correspond with the depth shown in FIG. 3A. Like torque, maximum instantaneous RPM also changes with changes in lithology. This is due to phenomenon such as stick slip, caused by friction between the bit and formation. Stick-slip, which represents the ratio of change in RPM (maximum RPM minus minimum RPM) with respect to average RPM, therefore shows similar changes. Just like torque, therefore, instantaneous RPM appears to be a good indicator of formation changes.

FIGS. 5E & F show plots of one-second tangential acceleration (FIG. 5E) and maximum tangential acceleration (FIG. 5F) versus depth, respectively. FIG. 5D shows gamma 502 and ROP 504 versus depth. The depth values in FIGS. 5E & F generally correspond with the depth shown in FIG. 5D. Like torque, tangential acceleration also changes with changes in lithology. For illustration, compaction slopes 506 and 508 are shown. As can be seen, a correlation appears between the measurements of tangential acceleration, both one-second and maximum, and gamma measurements. Just like torque, therefore, tangential acceleration appears to be a good indicator of formation changes.

Like torque, tangential acceleration also changes with changes in lithology. A correlation appears between the measurements of tangential acceleration, both one-second and maximum, and gamma measurements. Just like tangential acceleration, lateral acceleration appears to be a good indicator of formation changes.

FIG. 6A-C show plots of bending moment versus depth, including a plot of x bending (BM-X) moment (FIG. 6A), a plot of the bending moment (BM-XY)(square root of the sum of the squares of x and y bending moments) (FIG. 6B), and a plot of the resultant bending moment (BM) (square root of the sum of squares of three bending moments, including downhole torque) (FIG. 6C). The depth values in FIGS. 6A-C generally correspond with the depth shown in FIG. 3A. As can be seen, the BM curve shows appreciable changes with respect to lithology. This might be attributed to the inclusion of downhole torque.

Figure 7:
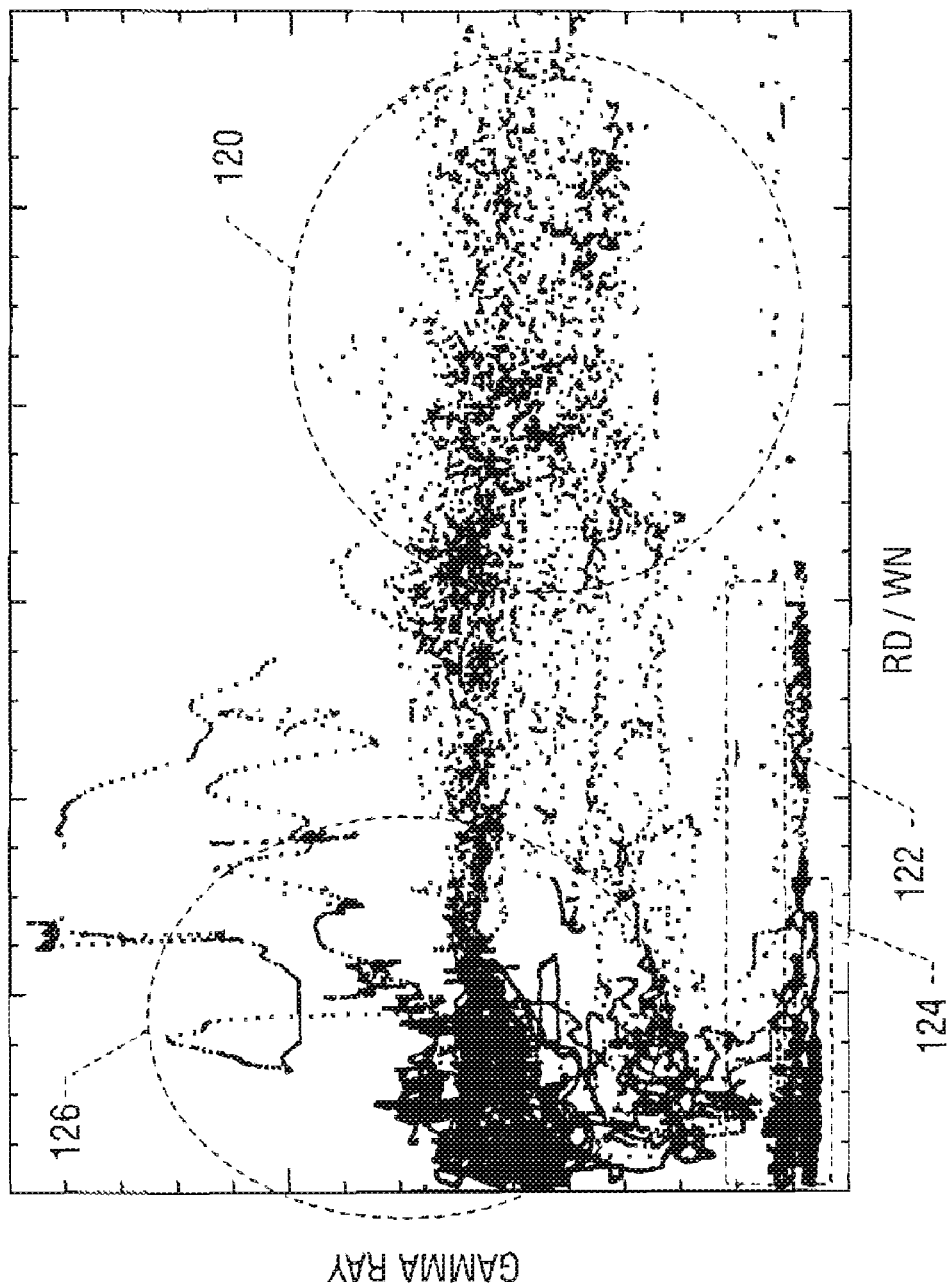
FIG. 7 illustrates a cross plot of RD/WN and gamma ray.
Figure 8:
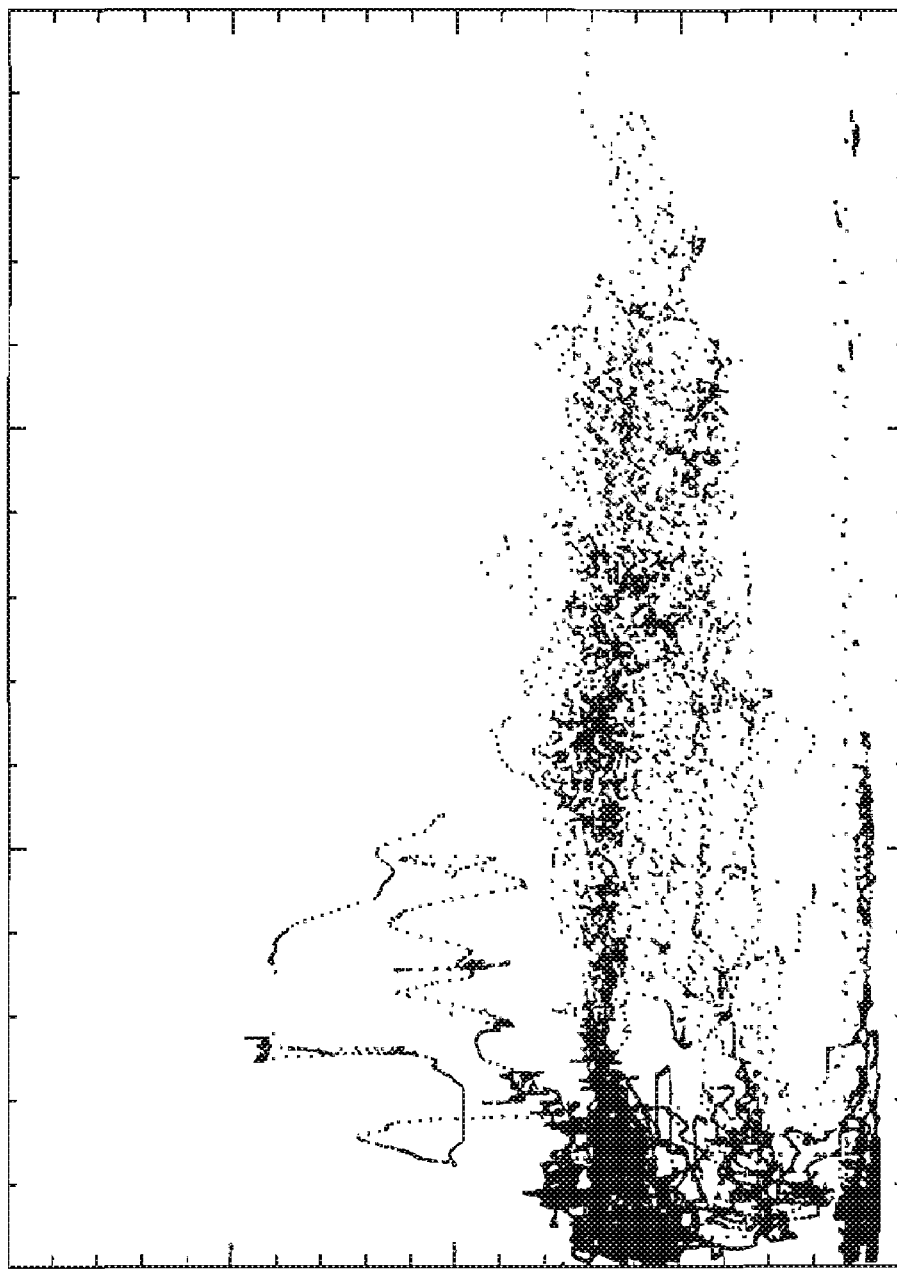
FIG. 8 illustrates a cross plot of Drilling Response and gamma ray.
Figure 9:
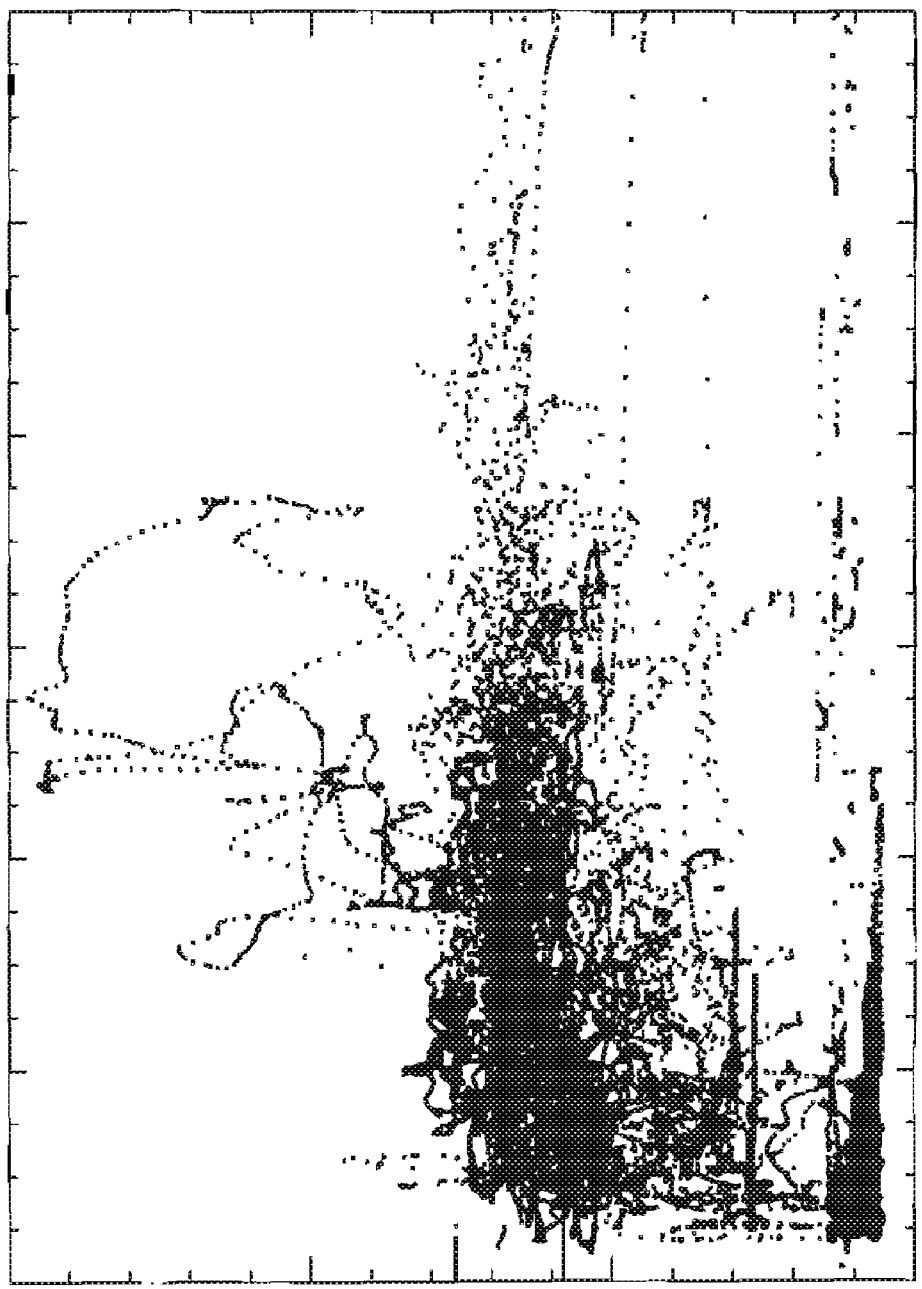
FIG. 9 illustrates a cross plot of Dynamic Drilling Response and gamma ray.

FIG. 7 shows the cross plot of drillability (RD/WN) and Gamma ray. As can be seen, there are four distinct clusters of data points at four different gamma ray levels. Each cluster of points shows a linear relationship between gamma ray and drillability with different intercepts and slop for each cluster. A first cluster 120 of points on the plot are mostly claystone and shale. A second cluster 122 of points is mostly chert and shale. A third cluster 124 is the chalk section. A fourth cluster 126 of points represents the claystone/siltstone section. FIGS. 8 and 9 show the corresponding plots for drilling response and dynamic drilling response. The positive slope for each group in the three plots shows that the formation related response increases with an increase in gamma ray response.

Figure 10:
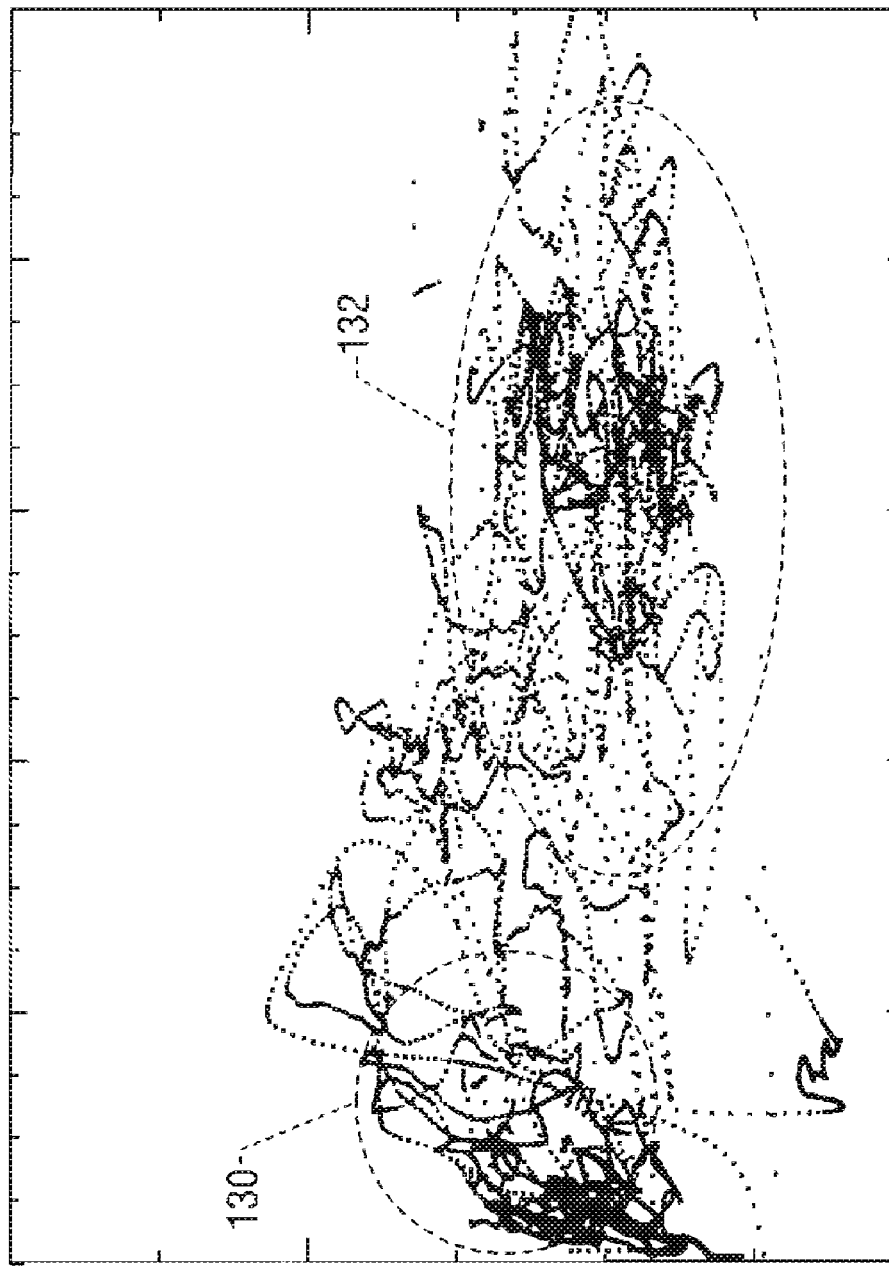
FIG. 10 illustrates a cross plot of RD/WN and T/WD for a first depth range.
Figure 11:
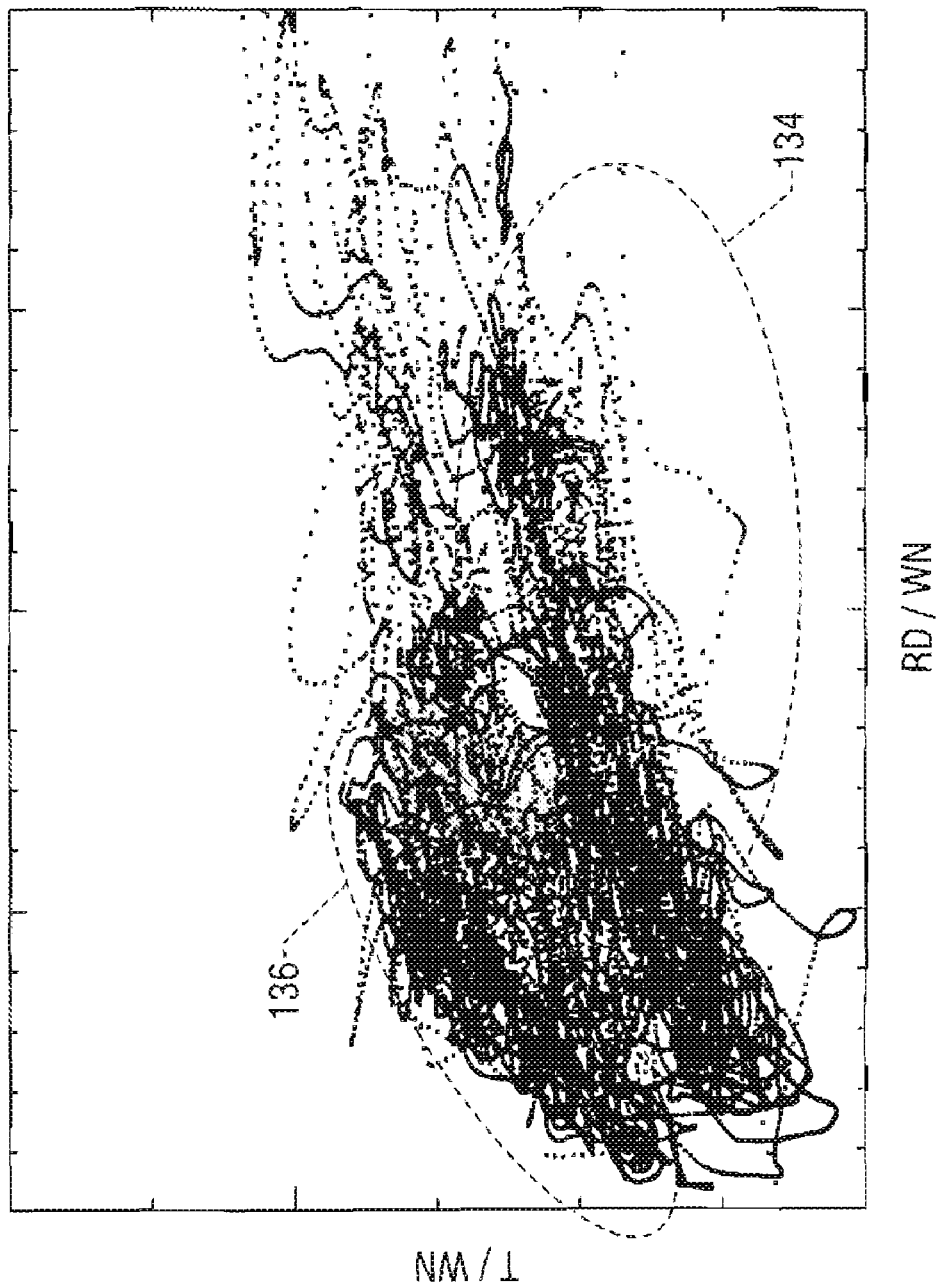
FIG. 11 illustrates a cross plot of RD/WN and T/WD for a second depth range.

FIGS. 10 and 11 show crossplots of drillability (RD/WN) and dimensionless torque (T/WD). The plots shows four distinct cluster of data points 130, 132, 134, and 136, with each cluster showing an approximately linear relationship between the two parameters. The cluster 130 of points appears to have nearly same slope as the cluster 134, indicating almost similar mechanical properties. The cluster 132 of points shows a lower slope.

It may be noted that at the intercept at ROP=0 (see equation 1), the torque to weight ratio is a function of friction coefficient, $$\frac{\mu}{4}.$$

Each of these clusters has a different intercept, which indicates a different lithology. The higher value of intercept in the case of the cluster 134 and the cluster 130 indicates a higher friction coefficient compared to the blue cluster 136 (claystone/siltstone). Based on the values of the intercepts, it is clear that a higher torque to weight ratio is needed to initiate drilling in chalk than in the claystone/siltstone lithology. The slope of each cluster is a function of drilling and shear strength. This plot in general shows that the two parameters individually (i.e., drillability and dimensionless torque), are good indicators of lithology.

Figure 12A:
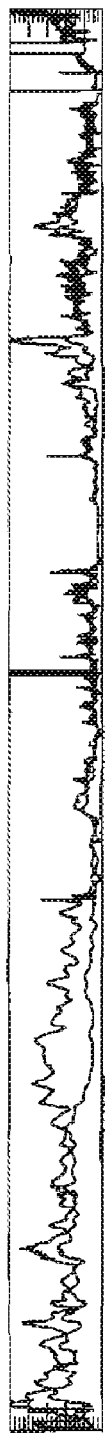
FIGS. 12A-C illustrate plots of Dynamic Drilling Response, Drillability, and Dimensionless Torque versus depth D, respectively.
Figure 12B:
Figure 12C:

FIGS. 12A-C show plots of dynamic drilling response (FIG. 12A), drillability (FIG. 12B) and dimensionless torque (FIG. 12C), respectively. The depth values in FIGS. 12A-C generally correspond with the depth shown in FIG. 3A. The dynamic drilling response, drillability & dimensionless plots show good correlation with the gamma ray and resistivity measurements.

Figure 13A:
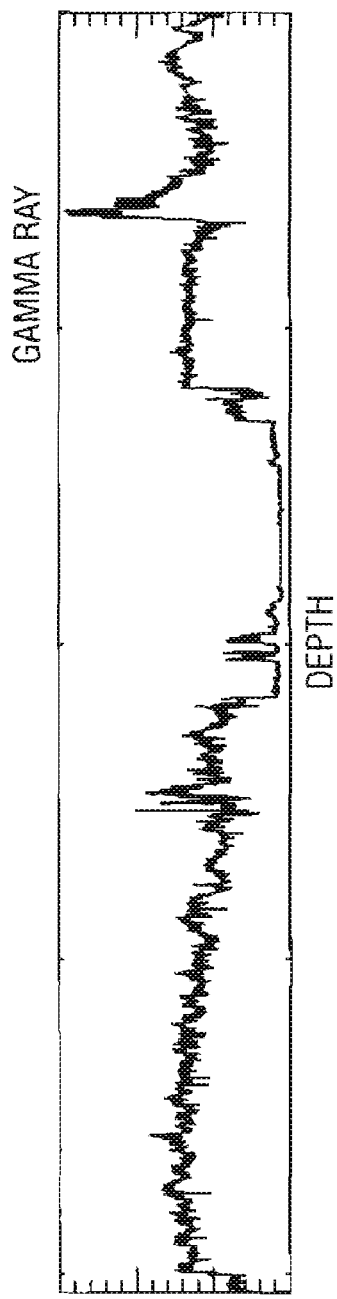
FIGS. 13A-C illustrate plots of gamma ray, resistivity, and Drilling Response versus depth D, respectively.
Figure 13B:
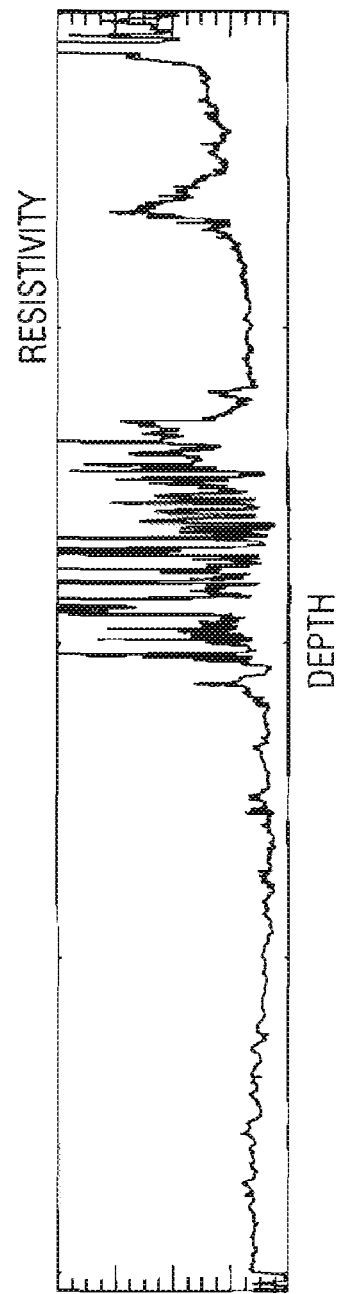
Figure 13C:
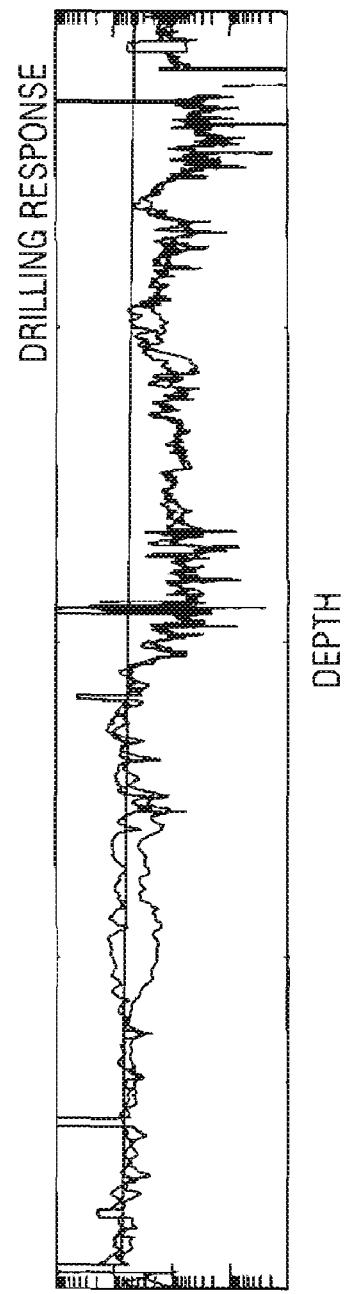

FIGS. 13A-C show plots of gamma ray (FIG. 13A), resistivity (FIG. 13B), and a plot of drilling response (FIG. 13C) plotted on log scale. The depth values in FIGS. 12A-C generally correspond with the depth shown in FIG. 3A. The plot shows good correlation of drilling response with the gamma ray.

Figure 14A:
FIGS. 14 A-E illustrate plots of gamma ray, resistivity, shear strength, Rock Strength; and Dynamic strength versus depth D, respectively.
Figure 14B:
Figure 14C:
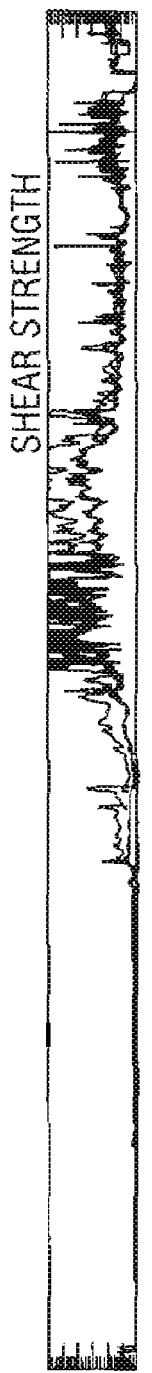
Figure 14D:
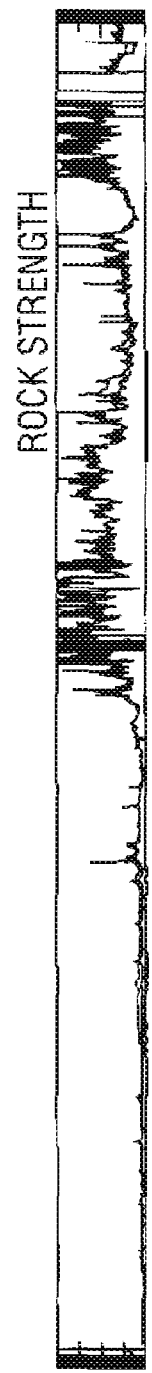
Figure 14E:
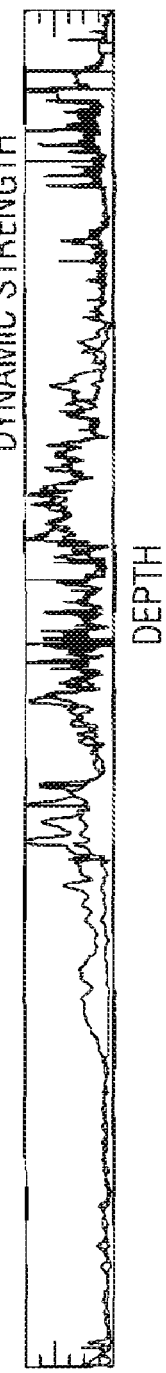

FIG. 14C-E show plots of shear strength (TN/RD2) (FIG. 14C), rock strength (WN/RD) (FIG. 14D) which is inverse of drillability, and plot of dynamic strength (W2N2/T Ax) (FIG. 14E), which is inverse of dynamic response in strength units. The three plots also show a correlation with plots of both resistivity (FIG. 3A) and gamma ray (FIG. 3B).

As reflected in FIGS. 3-14, dynamic measurements and model derived expressions can be used as formation change indicators while drilling. The figures described above have been shown juxtapositioned with respect to depth where possible to further illustrate relationships and correlations that can be developed between changes in lithology and measured parameters. It should be appreciated that the above-discussed lithology indicator parameters are merely exemplary of the dynamic measurements and model derived expressions that could be used for determining lithology indications during drilling. For example, in addition to axial, lateral and tangential acceleration, torsional acceleration can also be used in certain applications. Acceleration, bending moment, and SNAP (HFRMS), for example, may provide a weak indication of lithology in some conditions but may provide stronger indications when combined with a particular model derived expression, BHA configuration or set of operating parameters. Additionally, processed dynamic parameters (e.g., axial velocity derived through integrating the axial acceleration) may be used as a replacement for ROP in the drilling model parameter groups.

Thus, generally speaking, in aspects, the present invention provides methodologies wherein one or more downhole measured parameters are selected for dynamic measurement. A feature of the selected measured parameter or parameters is that a change in the lithology of the formation being drilled has a discernable affect on that selected measured parameter. Thus, aspects of the present invention include a method of selecting a suitable parameter by comparing dynamic measurements of selected parameters with known lithological data. This comparison can include determining the strength of the correlation between changes in the measurements of the selected parameter and the known lithological data. Lithological models can be formulated based on the parameter measurements having a relatively strong correlation to lithology. Lithological models based one or more of these measured parameters can thereafter utilized to obtain an indication of lithology during drilling. Other methodologies and systems are described in U.S. Pat. Nos. 5,415,040 and 4,852,399, which are hereby incorporated by reference for all purposes.

Referring now to FIGS. 1 and 2, in an exemplary drilling operation, rotary power provided at the surface and/or downhole rotates the drill bit 56. The bit disintegrates rock and earth and thereby forms a wellbore through the formation. The processor(s) 12 continuously or periodically processes surface data and downhole data, including dynamic measurements, to determine whether the formation being drilled by the drill bit 56 has a lithological make-up different from the formation already drilled. Advantageously, this lithological indication can be obtained relatively quickly, i.e., as the drill bit 56 enters the new lithology, rather than when the MWD tool 46, which can trail the drill bit 56 by over fifty feet enters the new lithology.

As discussed earlier, the lithological indications can be used in several ways. For example, if the lithology indications suggest entry into a high-pressure zone, then mud weight can be appropriately increased to control wellbore pressure. Conversely, if the lithology indications suggest a relatively low pore pressure, the mud weight can be decreased to prevent damage to the formation. Moreover, the system 10 can provide an early indication of boundaries or interfaces between different subterranean formations. Thus, in situations where the lithology is unfavorable, the "rat hole" into the unfavorable lithology can be minimized. The lithology indications can also be used to supplement surface seismic data with more precise depth locations for bed boundaries and formation interfaces.

While preferred embodiments have been shown and described various modifications and substitutions may be made thereto without departing from the scope of the invention. Accordingly, it is to be understood that the present invention has been described by way of illustrations and not limitations.

The invention claimed is:

1. A method for determining one or more properties of a subsurface formation traversed by a wellbore, comprising:
   (i) drilling the wellbore using a drilling system;
   (ii) measuring at least one dynamic parameter of interest relating to the drilling system that is affected by the lithology of the formation being drilled, the measurement including a plurality of measurements of frequency and amplitude over a specified time interval; and
   (iii) determining a change in lithology of the formation being drilled using the plurality of measurements of frequency and amplitude.

2. The method according to claim 1, wherein the at least one parameter is selected from a group consisting of: (i) instantaneous downhole weight on bit, (ii) instantaneous downhole torque on bit, (iii) instantaneous drill bit revolution, (iv) instantaneous drill string revolution, (v) instantaneous axial acceleration, (vi) instantaneous tangential acceleration, (vii) instantaneous lateral acceleration and (viii) instantaneous torsional acceleration.

3. The method according to claim 1, wherein the change is determined using a processor utilizing a model.

4. The method according to claim 3, wherein the model includes one of: (i) drill bit geometry, (ii) bottomhole assembly (BHA) geometry, (iii) drill string geometry, (iv) BHA operating behavior, and (v) BHA prior run data.

5. The method according to claim 3, wherein the model includes a relationship using one of: (i) rate of penetration, and (ii) acceleration.

6. The method according to claim 3, wherein the model includes a relationship selected from one of $$\frac{RD}{WN}, \quad (i)$$

$$\frac{RD^3}{NW^2}, \quad (ii)$$

$$\frac{TR}{W^2N}, \quad (iii)$$

$$\frac{TA_x}{[WN]^2}, \quad (iv)$$

$$\frac{T}{WD}, \text{ and} \quad (v)$$

$$\frac{TN}{RD^2}. \quad (vi)$$

where T represents a torque on a drill bit, W is a downhole weight on the drill bit, R is a rate of penetration, N is a revolutions per minute, $A_x$ is an axial acceleration, and D is the drill bit diameter.

7. The method according to claim 1, wherein the at least one lithological characteristic is determined at one of (i) downhole, and (ii) at the surface.

8. The method according to claim 1 further comprising adjusting drilling in response to the determined change.

9. The method according to claim 1 further comprising determining a correlation between the at least one measured dynamic parameter of interest and at least one lithological characteristic prior to drilling the wellbore; and using the correlation to determine at least one lithological characteristic of the formation while drilling by using the plurality of measurements.

10. The method according to claim 1, wherein at least one lithological characteristic of the formation is determined while drilling.

11. An apparatus for determining one or more properties of a subsurface formation traversed by a wellbore, comprising:
    (i) a bottomhole assembly (BHA) drilling the wellbore;
    (ii) at least one sensor dynamically measuring at least one parameter of interest that relates to the BHA and that is affected by a lithology of the formation being drilled, the measurement being made downhole; and
    (iii) a processor configured to determine a change in lithology of the formation being drilled using a plurality of measurements of frequency and amplitude of the parameter of interest over a specified time.

12. The apparatus according to claim 11, wherein the at least one parameter is selected from a group consisting of: (i) instantaneous downhole weight on bit, (ii) instantaneous downhole torque on bit, (iii) instantaneous drill bit revolution, (iv) instantaneous drill string revolution, (v) instantaneous axial acceleration, (vi) instantaneous tangential acceleration, (vii) instantaneous lateral acceleration and (viii) instantaneous torsional acceleration.

13. The apparatus according to claim 11, wherein the processor includes a model.

14. The apparatus according to claim 13, wherein the model includes one of: (i) drill bit geometry, (ii) BHA geometry, (iii) drill string geometry, (iv) BHA operating behavior, and (v) BHA prior run data.

15. The apparatus according to claim 13, wherein the model includes a relationship using one of: (i) rate of penetration, and (ii) acceleration.

16. The apparatus according to claim 13, wherein the model includes a relationship selected from one of $$\frac{RD}{WN}, \quad (i)$$

$$\frac{RD^3}{NW^2}, \quad (ii)$$

-continued $$\frac{TR}{W^2N}, \quad \text{(iii)}$$

$$\frac{TA_x}{[WN]^2}, \quad \text{(iv)}$$

$$\frac{T}{WD}, \text{ and} \quad \text{(v)}$$

$$\frac{TN}{RD^2}. \quad \text{(vi)}$$

where T represents a torque on a drill bit, W is a downhole weight on the drill bit, R is a rate of penetration, N is a revolutions per minute, $A_x$ is an axial acceleration, and D is the drill bit diameter.

17. The apparatus according to claim 11, wherein the at least one lithological characteristic is determined at one of (i) downhole, and (ii) at the surface.

18. The apparatus according to claim 11, wherein the processor includes a determined correlation between at least one dynamically measured parameter of interest and at least one lithological characteristic prior to drilling the wellbore and is programmed to use the correlation to determine the at least one lithological characteristic of the formation while drilling.

19. The apparatus according to claim 11, wherein the processor determines the change during drilling.

20. A method for determining a transition in a lithology of a subsurface formation traversed by a wellbore, comprising:
    (i) measuring at a plurality of points in time at least one parameter of interest relating to a downhole tool that is affected by formation lithology, the measurements including measurements of frequency and amplitude; and
    (ii) determining the transition in lithology by correlating the plurality of measurements to a model without averaging the plurality of measurements.

21. An apparatus for determining one or more properties of a subsurface formation traversed by a wellbore, comprising:
    (i) a drill string;
    (ii) a bottomhole assembly (BHA) coupled to the drill string;
    (iii) at least one sensor configured to measure at least one parameter of interest relating to one of the BHA and the drill string; and
    (iv) a processor configured to receive measurements from the at least one sensor and configured to determine a change in lithology of the formation being drilled by determining a change in frequency and amplitude of the plurality of measurements of the at least one measured parameter of interest.

22. The apparatus of claim 21 wherein the at least one sensor includes a sensor measuring a differential pressure in a drilling motor associated with the BHA.

23. The apparatus of claim 22 wherein the processor further comprises a model that correlates the at least one parameter of interest to one of: (i) gamma ray, (ii) density, (iii) and (iv) resistivity.

24. The apparatus of claim 21 wherein the at least one sensor includes a sensor measuring high frequency axial strain (SNAP).

25. The apparatus of claim 24 further comprising a model that correlates the at least one measured parameter of interest to rate of penetration.

26. The apparatus of claim 21 further comprising a data transmission system configured to transmit data from the BHA to the surface.

27. The apparatus of claim 26 wherein the data transmission system uses one of (i) mud pulse, (ii) conductive wire along the drill string; (iii) conductive wire in the drill string; (iv) RE, and (v) EM.

28. A method for determining one or more properties of a subsurface formation traversed by a wellbore, comprising:
    (i) drilling the wellbore;
    (ii) instantaneously measuring at least one parameter of interest relating to one of the BHA and the drill string and that is affected by the lithology of the formation being drilled, the measurement being made downhole a plurality of times over a specified time interval; and
    (iii) determining a change in lithology of the formation being drilled by determining a change in frequency and amplitude of the plurality of measurements of the parameter of interest and without averaging the plurality of measurements.

29. The method of claim 28 wherein the at least one parameter of interest is a differential pressure in a drilling motor associated with the BHA.

30. The method of claim 29 further comprising correlating the at least one parameter of interest to one of: (i) gamma ray, (ii) density, (iii) and (iv) resistivity.

31. The method of claim 28 wherein the at least one parameter of interest is high frequency axial strain (SNAP).

32. The method of claim 31 further comprising correlating the at least one measured parameter of interest to rate of penetration.

33. The method of claim 28 further comprising transmitting data from the BHA to the surface.

34. The method of claim 33 wherein the transmitting uses one of: (i) mud pulse, (ii) conductive wire along the drill string; (iii) conductive wire in the drill string; (iv) RE, and (v) EM.

* * * * *

UNITED STATES PATENT AND TRADEMARK OFFICE
CERTIFICATE OF CORRECTION

| | |
|---|---|
| PATENT NO. | : 7,650,241 B2 |
| APPLICATION NO. | : 11/357332 |
| DATED | : January 19, 2010 |
| INVENTOR(S) | : Pushkar Jogi et al. |

It is certified that error appears in the above-identified patent and that said Letters Patent is hereby corrected as shown below:

Column 16, claim 28, line 25, delete "the BHA and the", insert --a bottomhole assembly (BHA) and a--.

Signed and Sealed this
Seventeenth Day of July, 2012

David J. Kappos
*Director of the United States Patent and Trademark Office*